(12) United States Patent
Donnellan

(10) Patent No.: US 12,304,277 B2
(45) Date of Patent: May 20, 2025

(54) TRANSPORT REFRIGERATION SYSTEM

(71) Applicant: THERMO KING LLC, Minneapolis, MN (US)

(72) Inventor: Wayne Donnellan, Galway (IE)

(73) Assignee: THERMO KING LLC, Minneapolis, MN (US)

( * ) Notice: Subject to any disclaimer, the term of this patent is extended or adjusted under 35 U.S.C. 154(b) by 7 days.

(21) Appl. No.: 18/356,430

(22) Filed: Jul. 21, 2023

(65) Prior Publication Data

US 2024/0025229 A1   Jan. 25, 2024

(30) Foreign Application Priority Data

Jul. 22, 2022   (EP) .................................... 22186470

(51) Int. Cl.
*B60H 1/00* (2006.01)
*B60P 3/20* (2006.01)

(52) U.S. Cl.
CPC ..... *B60H 1/00735* (2013.01); *B60H 1/00014* (2013.01); *B60H 1/00871* (2013.01); *B60P 3/20* (2013.01)

(58) Field of Classification Search
CPC ............ B60H 1/00014; B60H 1/00735; B60H 1/00871; B60H 1/3232; F25D 11/003; F25D 23/069; B60P 3/20
See application file for complete search history.

(56) References Cited

U.S. PATENT DOCUMENTS

| | | | |
|---|---|---|---|
| 10,342,162 B2 * | 7/2019 | Myrah | H05K 7/20836 |
| 2002/0134095 A1 | 9/2002 | Temmyo et al. | |
| 2015/0316311 A1 * | 11/2015 | Kopecka | B60H 1/00014 62/332 |
| 2017/0036511 A1 * | 2/2017 | Lee | B60W 40/08 |
| 2017/0136844 A1 * | 5/2017 | Neu | B60H 1/3232 |
| 2019/0016267 A1 * | 1/2019 | Putcha | B65D 88/745 |
| 2019/0316827 A1 * | 10/2019 | Senf, Jr. | F25B 5/02 |

(Continued)

FOREIGN PATENT DOCUMENTS

| | | |
|---|---|---|
| EP | 3241724 | 11/2017 |
| JP | 03-31673 | 2/1991 |

(Continued)

OTHER PUBLICATIONS

Extended European Search Report, issued in the corresponding EP patent application No. 22186470.5, dated Mar. 14, 2023, 9 pages.

*Primary Examiner* — Marc E Norman
(74) *Attorney, Agent, or Firm* — HSML P.C.

(57) ABSTRACT

The present disclosure provides a transport refrigeration system for a refrigerated transport unit having an interior space comprising two or more zones. The system includes: a refrigeration circuit configured for temperature control of the zones and a controller. For each of the zones: the refrigeration circuit comprises a respective evaporator and a variable speed air mover driven by a motor. The controller is configured to: determine a target flow rate for the return air in the respective zone; and operate the motor to maintain the target flow rate of return air in the respective zone. The target flow rate is variable, and the controller is configured to determine the target flow rate based on one or more variable parameters monitored or determined by the controller.

19 Claims, 3 Drawing Sheets

(56) References Cited

U.S. PATENT DOCUMENTS

2019/0316828 A1* 10/2019 Kosakowski ........... F25D 17/06
2020/0139790 A1* 5/2020 Burchill ............... B60H 1/3232

FOREIGN PATENT DOCUMENTS

| JP | 05-10971 | 2/1993 |
| JP | 11-148759 | 6/1999 |
| JP | 2016-223748 | 12/2016 |
| WO | 2020/166014 | 8/2020 |

* cited by examiner

TRANSPORT REFRIGERATION SYSTEM

FIELD OF INVENTION

The present disclosure relates to a transport refrigeration system, a transport refrigeration unit, and a method of controlling airflow in a transport refrigeration system.

BACKGROUND

Transport refrigeration systems (TRS) are typically used to maintain the temperature of an interior space of a refrigerated transport unit (TRU), for example a trailer or a container. Refrigerated transport units are commonly used to transport perishable items such as meat and fresh produce, which need to be stored at climate controlled conditions during transport. Transport refrigeration systems generally comprise a refrigeration circuit which is used to condition the air inside the interior space of the transport unit in order to maintain the space at a particular temperature or temperature range. The refrigeration circuit can include a compressor, a condenser, an expansion valve, an evaporator and fans or blowers to control the heat exchange between air within the interior space and ambient air outside the TRU.

Some transport units have an interior space divided into zones, where each zone may be maintained at a different temperature, according to the cargo contained within the respective zone. Whilst these transport units have this capability, there remains a need to control procedures for temperature maintenance.

SUMMARY

According to a first aspect of the present disclosure, there is provided a transport refrigeration system for a refrigerated transport unit having an interior space comprising one or more zones, the system comprising: a refrigeration circuit configured for temperature control of the one or more zones; a controller; and wherein for each of the one or more zones: the refrigeration circuit comprises a respective evaporator and a variable speed air mover driven by a motor, the air mover being configured to circulate a flow of return air from the respective zone past the evaporator; and the controller is configured to: determine a target flow rate for the return air in the respective zone; operate the motor to maintain the target flow rate of return air in the respective zone; wherein the target flow rate is variable, and wherein the controller is configured to determine the target flow rate based on one or more variable parameters monitored or determined by the controller; wherein the one or more parameters include a dimension of the respective zone; and/or wherein the interior space includes multiple zones, and the one or more parameters include (i) an operating status of the respective zone; and (ii) one or more parameters relating to the operating status of the remaining zones of the interior space.

The target flow rate may be a target volumetric flow rate.

The controller may be configured to, for each of the one or more zones: determine a target speed for the respective air mover based on the target volumetric flow rate, and operate the motor based on the target speed to maintain the target volumetric flow rate of return air in the respective zone.

The controller may be configured to determine the target flow rate for the or each zone by reference to a database of predetermined zone flow parameters correlated to one or more of: (i) an operating status of the respective zone; (ii) one or more parameters relating to the operating status of any remaining zones of the interior space; and (iii) a number of zones associated with the interior space.

The one or more parameters relating to the operating status of the remaining zones of the interior space may comprise a utilization parameter which relates to the number of zones of the interior space which are subject to temperature control.

The system may further comprise an input device configured to receive user input to set the zone flow parameters for the or each zone.

For each of the one or more zones, the controller may be configured to determine the target flow rate based on a target air exchange rate for the zone. Air exchange rate and flow rate are considered to be a function of one another.

The controller may be configured to determine a volume of the or each zone, and to determine the target flow rate for the zone based on the volume and the target air exchange rate for the zone, wherein the target flow rate is a target volumetric flow rate.

The system may further comprise, for at least one zone of the one more zones: a distance sensor or similar device configured to estimate one or more dimensions of the zone. It will be appreciated that any suitable type of sensor for determining a parameter relating to a dimension of the zone may be used, for example an optical sensor, an imaging sensor (e.g. camera sensor) provided with suitable processing, a sonic (e.g. ultrasonic sensor), an infrared sensor, or any equivalent sensor. The controller may be configured to: estimate the volume of the zone based on the one or dimensions; and determine the target volumetric flow rate for the zone based on the estimated volume and the air exchange rate for the zone.

The system may further comprise, for each of the one or more zones, an air mover speed sensor configured to monitor the speed of the air mover. The controller may be configured to compare the monitored speed of the air mover to the target speed and adjust the operation of the motor based on the comparison.

According to a second aspect of the present disclosure, there is provided a transport refrigeration unit comprising an interior space comprising one or more zones; and a transport refrigeration system in accordance with the first aspect of the present disclosure.

The transport refrigeration unit may have one or more moveable partitions such that the at least one zone associated with the distance sensor has a variable volume. The distance sensor may be configured to monitor one or more dimensions that vary responsive to movement of a respective partition.

According to a third aspect of the present disclosure, there is provided a method of controlling airflow in a refrigerated transport unit having an interior space comprising at least one zone, the method comprising, for each zone, a controller determining a target flow rate for a flow of return air from the respective zone past an evaporator associated with the zone; operating a motor based on the target flow rate to drive a variable speed air mover to provide airflow through the zone; wherein the target flow rate is variable, and wherein the controller determines the target flow rate based on one or more variable parameters monitored or determined by the controller; wherein the one or more parameters include a dimension of the respective zone; and/or wherein the interior space includes multiple zones, and the one or more parameters include (i) an operating status of the respective zone; and (ii) one or more parameters relating to the operating status of the remaining zones of the interior space.

The controller may determine the target flow rate for the or each zone by reference to a database of predetermined zone flow parameters. The method may further comprise setting or updating one or more zone flow parameters in the database. The setting or updating may be performed via a user interface of the transport refrigeration system, or by a remote communications link.

The method may further comprise monitoring a speed of the air mover; comparing the monitored speed of the air mover to the target speed; and adjusting the operation of the motor based on the comparison.

DETAILED DESCRIPTION

Figure 1:
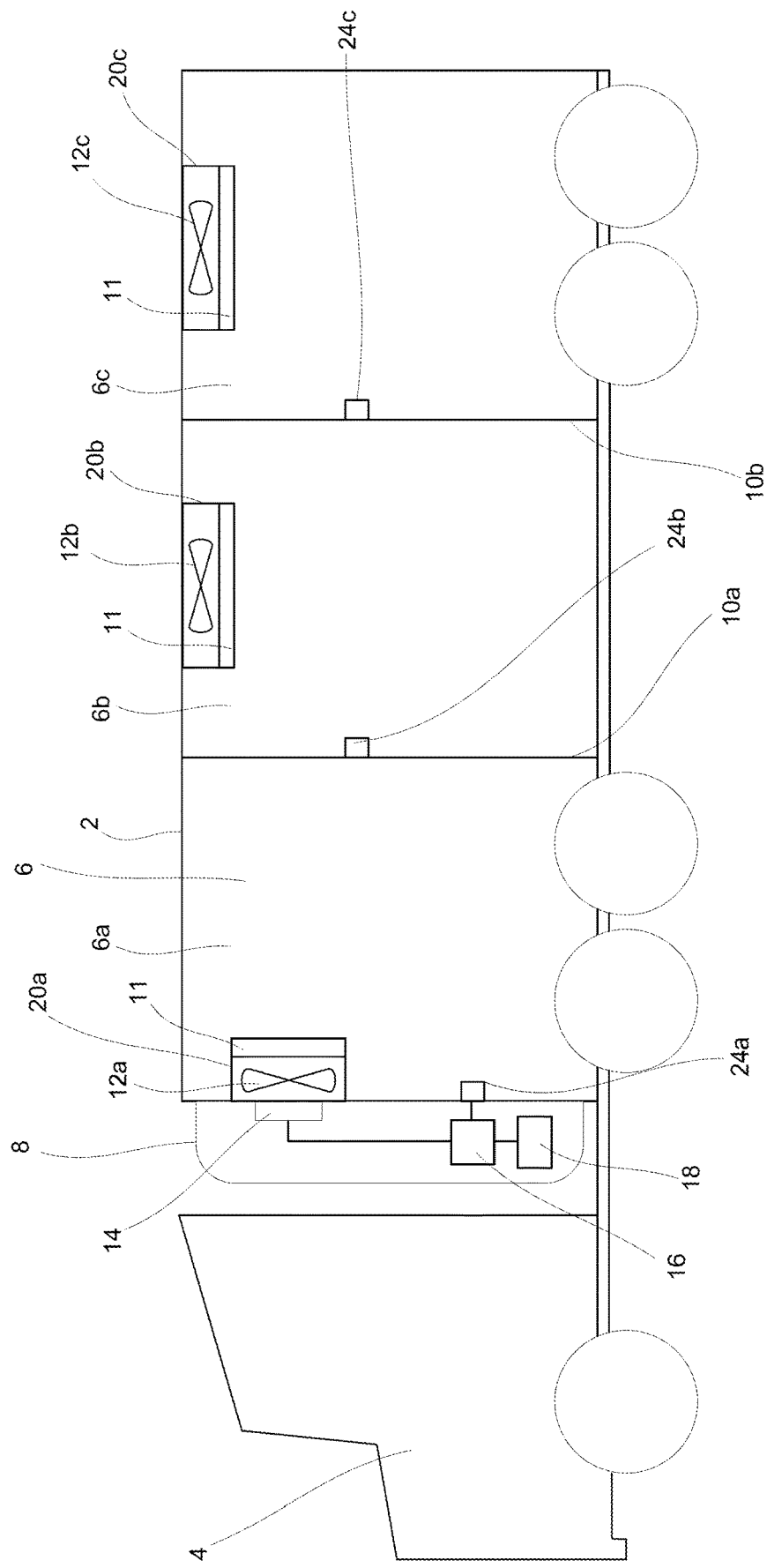
FIG. 1 shows an example transport refrigeration system according to the present disclosure.

FIG. 1 shows an example implementation of a transport refrigeration system (TRS) 8 provided for a transport refrigeration unit (TRU) 2, which in this specific example is a refrigerated trailer 2 towed by a truck 4. It will be appreciated that the examples described herein are not limited to truck and trailer units but can apply to any type of transport refrigeration unit (e.g. a tractor, a container, a box car, a semi-tractor, a bus, etc.).

The refrigerated transport unit 2 comprises an outer wall defining an interior space 6. In this example, the interior space 6 is divided into three zones: a front zone 6a, a middle zone 6b, and a rear zone 6c. The term "zone" used here means a part of the interior space 6 of the transport unit which is separated from other zones by walls (e.g. partitions). In other examples, the interior space 6 may not be divided, such that it only has a single zone. In further examples, the interior space 6 may be divided into two or more zones.

As shown in FIG. 1, the interior space 6 is divided by two bulkheads 10a, 10b to form dividing walls (also referred to herein as partitions) between the three zones 6a, 6b, 6c. Each bulkhead 10a, 10b forms a thermal barrier between adjacent zones that inhibits heat exchange between the zones to some extent. In this example, each of the two bulkheads 10a, 10b extends transversely across the width of the interior space 6, such that the interior space 6 is divided into three zones in series along the length of the interior space 6. The position of each bulkhead 10a, 10b can be variable within the interior space (and between example implementations of a refrigerated transport unit), and the number and configuration of bulkheads 10a, 10b used can be changed such that the interior space 6 can be divided into any number of zones of varying sizes.

A transport refrigeration system (TRS) 8 is integrated with the transport refrigeration unit 2 and includes a body on a front wall of the TRU 2 and components in communication with the interior space 6 of the TRU 2. In other examples, the TRS 8 can be disposed at least partly on a roof or other wall of the transport unit 2. The TRS 8 is configured to transfer heat between the interior space of the transport unit 2 and the external environment. The TRS 8 includes a refrigeration circuit that fluidly connects, a compressor, a condenser, and an evaporator 11 to provide temperature control of the air within the interior space 6 of the transport unit 2, in a manner as is known in the art. The evaporator 11 is located in or in fluid communication with the interior space 6 and is a heat exchanger configured to receive a cooled liquid or multiphase refrigerant for evaporation, thereby removing heat from the interior space 6 as is known in the art. The TRS 8 may be powered by an engine, a genset (i.e. a generator powered by an engine, power take-off means), and/or by other electrically powered means (e.g. a battery, solar power source and the like).

The evaporator 11 of the TRS 8 is provided with an air mover 12 (or evaporator fan) which is driven by a motor 14. The air mover 12 is a variable speed air mover 12 and is operable to circulate airflow from the interior space through (e.g. past) the evaporator 11 to facilitate heat transfer. In the art, such a flow of air is referred to as "return air" or "supply air"—i.e. the air which is returned to the evaporator 11 and which is discharged from the evaporator (and supplied to the cargo stored therein). However, it should be appreciated that return air and supply air are effectively the same flow of air, merely defined with respect to positions upstream or downstream of the evaporator. Accordingly, references herein to a flow rate of return air may be considered to be interchangeable and equivalent to a flow rate of supply air.

The air mover 12 may be a fan, otherwise known as a blower.

In this example, there is a plurality of evaporators 11 and air movers 12a, 12b, 12c (collectively or generically "12") associated with each of the respective zones (i.e. the forward zone 6a, middle zone 6b and rear zone 6c) in respective evaporator modules 20a, 20b, 20c (collectively or generically "20"), for providing heat transfer for the respective zones. Each evaporator module 20a, 20b, 20c comprises at least one air mover 12a, 12b, 12c which provides airflow through (e.g. past) the respective evaporator for temperature control of the respective zone. Each air mover is driven by a respective motor. The evaporator modules are each connected to the TRS 8 and are fluidly connected to the refrigeration circuit, for example in a parallel and/or series arrangement. In this example, the evaporator modules are disposed on a wall (12a) or ceiling (12b, 12c) of the respective zones. In other examples, the evaporator modules may be disposed in any suitable position within or in fluid communication with each zone such that heat transfer is facilitated.

The TRS 8 also comprises a controller 16, which is connected to, and configured to control the operation of components of the refrigeration circuit including the air movers 12 of the evaporator modules (e.g. by control of the respective motors).

The controller 16 is configured to control components of the refrigeration circuit to target or maintain various operation conditions in the interior space, including temperature and optionally humidity and other properties.

The controller 16 may include a single integrated control unit or may include a distributed network of control units. The controller may include a processor, a memory, a clock, and may comprise or be provided with an input/output interface (which may be at a remote location from other components of the controller, for example in a cab of a vehicle). The input/output interface can be a human-machine-interface (HMI) 18 provided to allow a user to input commands to the controller. The input/output interface 18 may also include a display. The input/output interface 18 may also comprise a remote device or mobile device which is wirelessly connected to the controller 16.

Figure 2A:
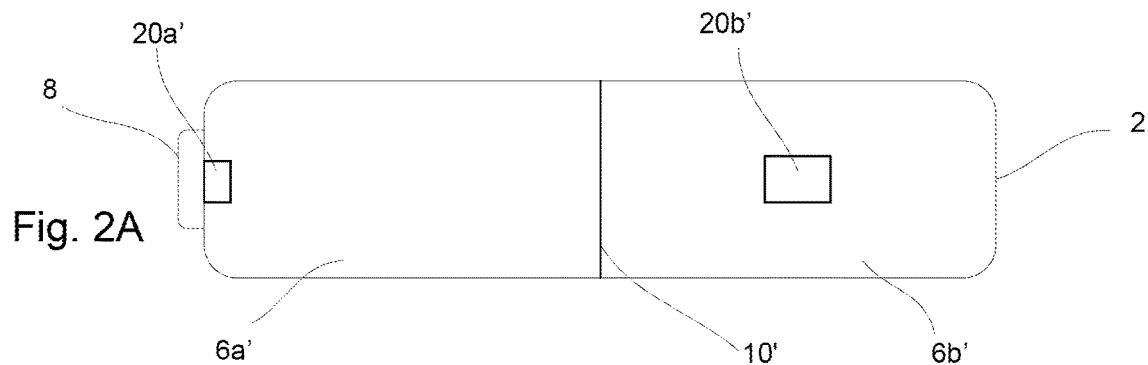
FIGS. 2A-D are plan views showing example zone configurations for a transport refrigeration unit.
Figure 2B:
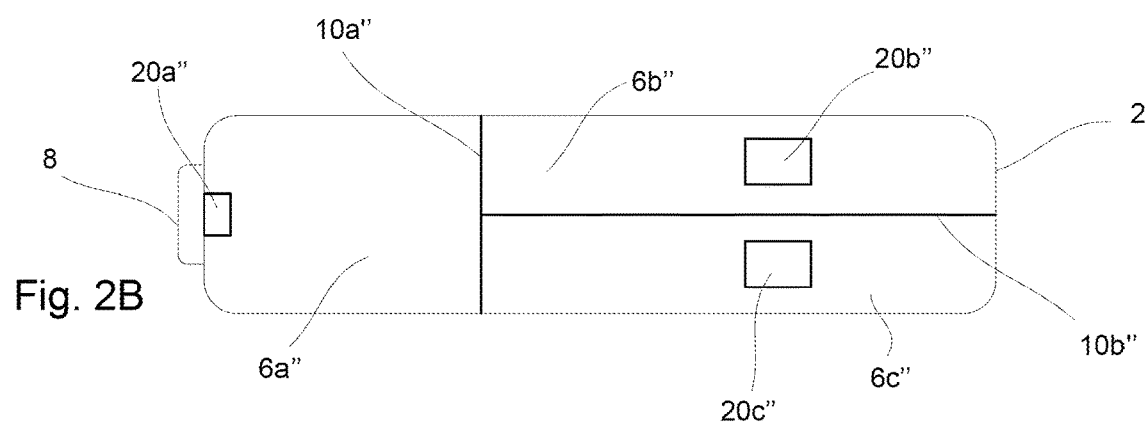
Figure 2C:
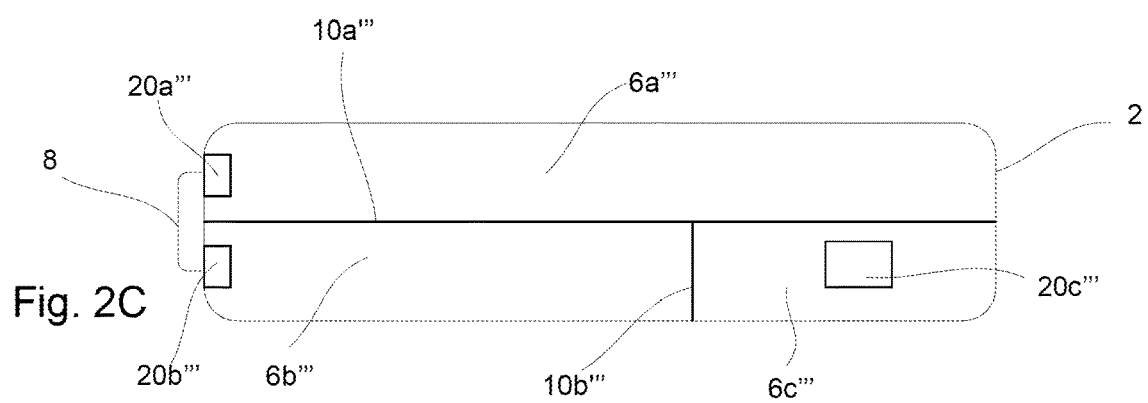
Figure 2D:
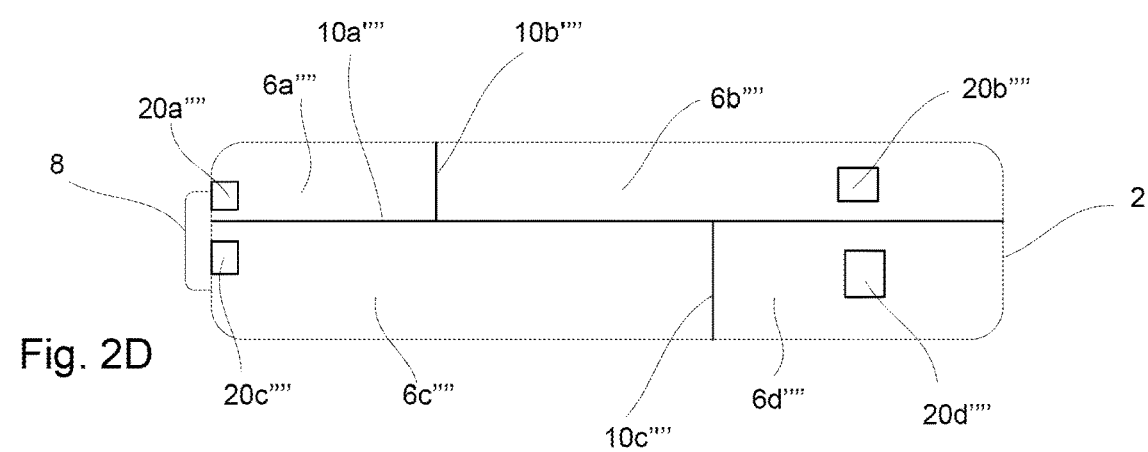

FIGS. 2A-D show non-limiting examples of different configurations of zones in the interior space 6. FIG. 2A is an example of a two-zone configuration in which a single bulkhead 10' extends in a transverse direction across the interior space 6 to divide the interior space 6 into two zones 6a', 6b'. In this example, an evaporator module 20a', 20b' is associated with each of the zones. FIG. 2B shows an example of a three-zone configuration in which a first bulkhead 10a" extends in a transverse direction across the interior space 6 and a second bulkhead 10b" extends from the first bulkhead 10a" in a longitudinal direction along the interior space 6 to divide the interior space 6 into three zones 6a", 6b", 6c". In this example, the zones comprise a front zone 6a" and two parallel rear zones 6b", 6c". An evaporator module 20a", 20b", 20c" is associated with each of the zones 6a", 6b", 6c". FIG. 2C is another example of a three-zone configuration in which a first bulkhead 10a''' extends in a longitudinal direction along the length of the interior space 6, and a second bulkhead 10b''' extends from the first bulkhead 10a''' in a transverse direction across the interior space 6. The interior space 6 is thereby divided into three zones: a right zone 6a''', a front left zone 6b''' and a rear left zone 6c'''. An evaporator module 20a''', 20b''', 20c''' is associated with each of the zones 6a''', 6b''', 6c'''. FIG. 2D shows an example of a four-zone configuration in which a first bulkhead 10a'''' extends in a longitudinal direction along the length of the interior space 6 and a second and third bulkhead 10b'''', 10c'''' extends from the first bulkhead 10a'''' in opposing transverse directions across the interior space 6. The interior space is thereby divided into four zones: a front right zone 6a'''', a rear right zone 6b'''', a front left zone 6c'''', and a rear left zone 6d''''. An evaporator module 20a'''', 20b'''', 20c'''', 20d'''' is associated with each of the zones 6a'''', 6b'''', 6c'''', 6d''''.

In other examples, it may be that a zone for temperature control comprises two sub-zones which may be partially divided by a bulkhead or partition, but which still permit air circulation between them. For the purposes of this disclosure, such sub-zones are considered as belonging to the same zone for temperature control, as they would be associated with the same evaporator module and be subject to the same associated calculations concerning flow rate.

Sensors may be provided for each zone to determine one or more dimensions of the zone. For example, such sensors may be coupled to each bulkhead 10a, 10b, or provided with each evaporator module 20. In the example shown in FIG. 1, distance sensors 24a, 24b, 24c are coupled to each bulkhead 10a, 10b and the front wall of the unit 2, and are configured to determine one or more dimensions of the zone including the length, width and/or height of each zone 6a, 6b, 6c. In this specific example, the sensors are configured to determine a length dimension, and the controller 16 is configured to determine a volume of the respective zones based on the length dimension and one or more other parameters (for example a predetermined or estimated (e.g. standard) cross-sectional area, width and/or height). In implementations where one or more bulkheads 10a, 10b are moved to different positions to change the dimensions of the zones, the sensors are configured to recognise this change and determine one or more updated dimensions of each zone. In other examples, one or more dimensions of the zones 6a, 6b, 6c or volumes of the zones can be provided to the controller by other means, for example by receipt of dimension or volume information at the controller (e.g. from an HMI as discussed above and/or by transmission (wired or wireless) from a remote controller). For example, such dimensions or a volume may be entered manually by a user via an HMI.

The refrigeration system is configured to control the temperature of each of the zones, which includes providing cooling and optionally providing heating and/or defrosting, in order to maintain the temperature at a given setpoint. The controller 16 is configured to control each of the evaporator modules 20a, 20b, 20c (and/or other components of the refrigeration system) to target and/or maintain a temperature of air in the respective zones at respective setpoints.

In use, one or more zones 6a, 6b, 6c may be required to be cooled in order to lower the temperature of the zone to a particular temperature set point. This is known as "pull-down" operation. In use, one or more zones 6a, 6b, 6c will be required to be heated to increase the temperature of the zone to a particular temperature set point. The refrigeration circuit may be configured as a reversible circuit such that each evaporator module may function as a condenser and heat the respective zone. Otherwise, a separate heater may be provided, for example one or more separate electric heaters may be provided. This is known as "pull-up" operation. In use, one or more zones 6a, 6b, 6c may be required to be maintained at a particular temperature set point, known as "steady-state" operation. This typically occurs after pull-down or pull-up operation, i.e., once the temperature set point has been reached. In order to achieve the temperature set-point for a zone in any of these operating conditions, a sufficient airflow must be circulated in the zone to provide the required heat transfer between the air within the zone and refrigeration circuit. The air mover 12 of each respective evaporator module is operated to circulate air in the zone through (e.g. past) the evaporator in order to provide the required heat transfer across the respective evaporator. A flow rate of air provided by the air mover of each evaporator module can influence the amount of heat transfer across the evaporator for each zone. The flow rate may be a volumetric flow rate. The inventors have considered that a suitable flow rate for each air mover is related to the size of the zone, and the speed of the motors and air blowers may therefore be controlled based on target flow rates, rather than by using a fixed speed or a feedback control loop based only on monitored temperature parameters.

Where the interior space of the transport unit has multiple zones, the controller 16 is configured to determine the flow rate required for each zone 6a, 6b, 6c based on the number of zones 6a, 6b, 6c which are present in the transport unit. For example, a user may input the amount and configuration of zones within the transport unit, or such data may be received from a remote source or be pre-programmed. The controller 16 may be configured to determine the volumetric flow rate required for each zone 6a, 6b, 6c based on the number of zones 6a, 6b, 6c which are operational in the transport unit (e.g. temperature controlled for transporting cargo). For example, for a 3-zone configuration as shown in FIG. 1, it may be that all three zones 6a, 6b, 6c are operational or that only some of the zones 6a, 6b, 6c are operational and the remainder remain unused or inactive. The controller 16 may store a table or database of predetermined zone flow parameters. The zone flow parameters can correlate to one or more of an operating status of the respective zone, one or more parameters relating to the operating status of any remaining zones of the interior space, and a number of zones the interior space 6 is divided into. The operating status may relate to whether a particular zone is configured for temperature control, and if the zone is configured for temperature control, whether the refrigeration system is operational for that zone. A utilization parameter may be used to characterise the number of zones of the interior space which are subject to temperature control. For example, the utilization parameter may relate to an aggregate of binary parameters for the total number of zones of the interior space, with the binary parameter being set to a particular value for each zone if the respective zone is configured for temperature control. In the table or database, each possible configuration of zone flow parameters corresponds to pre-set values of volumetric flow rate or related parameters for each zone. These values may be determined from experimental data or best practice calculation and may also be related to the total volume of the transport unit 2. Upon operation of the system, a user may use the HMI 18 or any other input device to input a particular set of zone flow parameters for the interior space. This set of zone flow parameters forms an operating configuration for the transport unit 2. The controller 16 can look up this operating configuration in the table to find the most appropriate values of volumetric flow rate for each operational zone. The table or database of predetermined zone flow parameters may be set or updated, for example based on updated best practice calculations or to reflect changes to the hardware of the transport unit 2. The database may be updated via the HMI 18 or any other input/output interface. The database may additionally or alternatively be updated via a remote communications link, for example via a wireless network or a mobile communications network. A mobile operator can download database updates automatically to the transport unit 2 or a user of the transport unit 2 may be notified that an update is available, and the user can choose to accept the download of the database update to the transport unit.

In other examples, a user may use the HMI 18 to manually enter a desired volumetric flow rate for each zone 6a, 6b, 6c. The volumetric flow rate may be dependent on, for example, the temperature setpoint, the mode of operation (pull-up/pull-down/steady state) and/or the volume of each zone 6a, 6b, 6c.

The volumetric flow rate for each zone 6a, 6b, 6c may be determined based on the desired air exchange rate. Air exchange rate can be defined as the rate at which an amount of air corresponding to the volume of the respective zone passes through (e.g. past) the evaporator, for example as return air. In the present disclosure the air exchange rate does not relate to ventilation or exchange of air with outside air. It may be specified as a value per unit time, for example a number per minute or hour. Air exchange rate can therefore be used to characterise the rate of flow in a given zone of the transport unit. A user can use the HMI 18 to input a target air exchange rate for the entire transport unit 2 or for each individual zone 6a, 6b, 6c. If an air exchange rate is set for the entire transport unit 2, each zone 6a, 6b, 6c will have the same air exchange rate, but may have different corresponding target volumetric flow rates owing to different volumes. The controller 16 may be configured to determine the volumetric flow rate for each zone 6a, 6b, 6c by multiplying the volume of each zone 6a, 6b, 6c by the air exchange rate for each zone 6a, 6b, 6c.

Once the target volumetric flow rate for a zone is determined, the controller 16 is configured to determine a corresponding target air mover speed or associated parameter (e.g. a power provided to an associated motor) to provide the desired volumetric flow for the zone. The target air mover speed or associated parameter (e.g. power) may be determined based on any suitable correlation between the target volumetric flow rate and the air mover speed. For example, the controller may refer to a look-up table or database containing predetermined correlations. The controller may be configured to calculate a suitable target air mover speed or associated parameter based on one or more properties selected from the group consisting of: a volume of the zone, a number of air movers in the zone, a position of the air movers in the zone, a characteristic metric relating to a size of the air mover, and a type of air mover present in the given zone. Based on the target air mover speed or associated parameter, the controller is configured to determine a motor control parameter for controlling the respective motor, for example a voltage signal. The voltage signal may be a Pulse Width Modulation (PWM) voltage signal or an analogue voltage signal. The refrigeration system is configured to provide a signal and/or power to the motor based on the determined motor control parameter, to drive it at a suitable motor speed to turn the air mover at the target air mover speed.

Each air mover 12 may further comprise an air mover speed sensor configured to monitor a speed of the air mover 12 (i.e. the rotational speed). For example, the sensor may be a tachometer sensor or a Hall effect sensor. The controller may be configured to compare the monitored air mover speed to the target speed. If the monitored air mover speed deviates from the target air mover speed by a threshold amount (e.g. a percentage or absolute value), the controller may adjust the operation of the motor accordingly to achieve the target speed. For example, this may be by adjusting the voltage signal to adjust the motor speed. This can be a continuous process of providing air mover speed feedback in a closed loop system. This enables the air mover speed and therefore volumetric flow rate to be accurately controlled.

Figure 3:
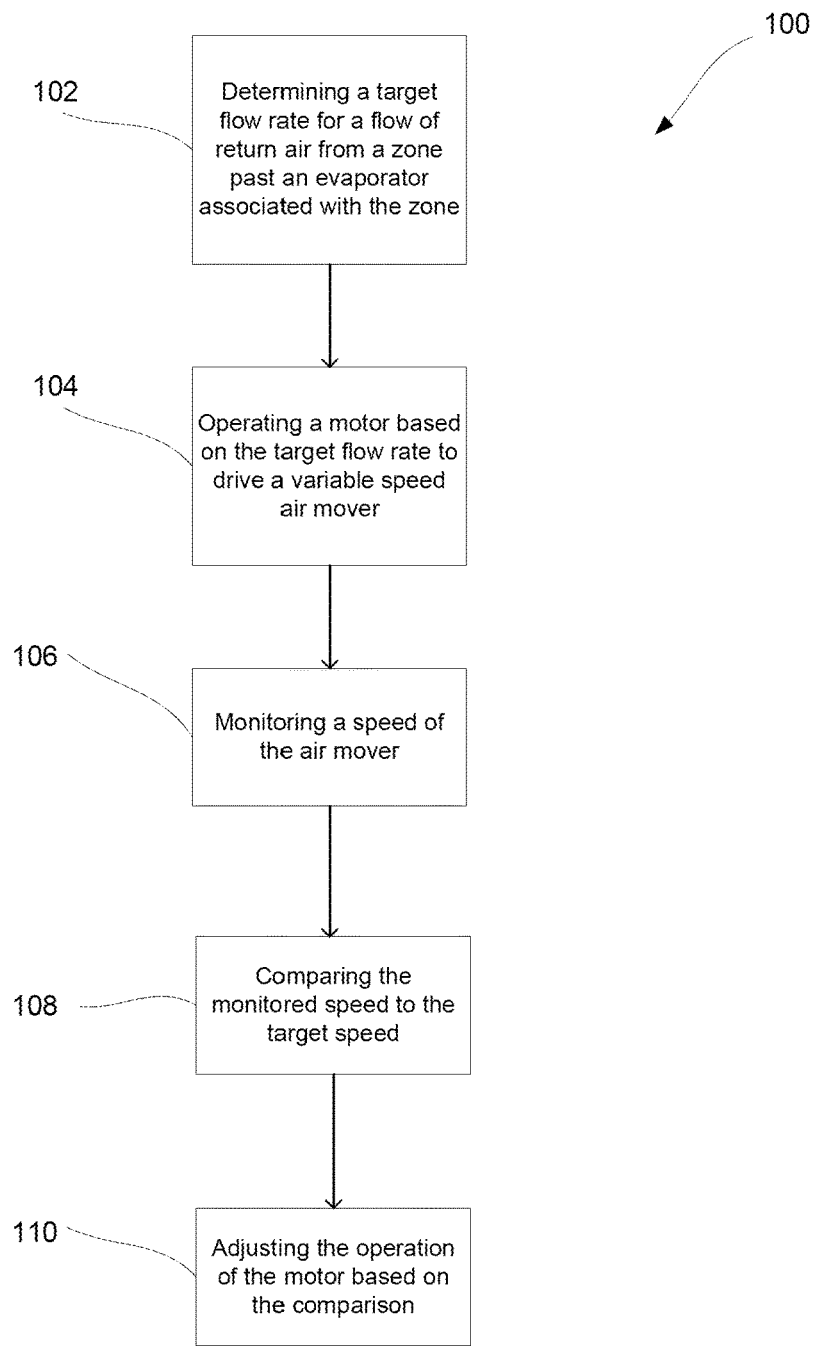
FIG. 3 is a flow diagram showing a method of controlling airflow in a transport refrigeration unit according to the present disclosure.

FIG. 3 is a flow diagram showing a method 100 of controlling airflow in a refrigerated transport unit having an interior space comprising one or more zones, for example as in accordance with the examples discussed above with respect to FIGS. 1 and 2. In a first step 102, the method comprises, for each zone, determining a target flow rate for a flow of return air from the respective zone past an evaporator associated with the zone. In a second step 104, the method comprises operating a motor based on the target flow rate to drive a variable speed air mover to provide airflow through the zone. The target flow rate is variable, and the controller determines the target flow rate based on one or more variable parameters monitored or determined by the controller. The one or more parameters include a dimension of the respective zone. Alternatively, or in addition, the interior space includes multiple zones and the one or more parameters include an operating status of the respective zone and one or more parameters relating to the operating status of the remaining zones of the interior space. Optionally, the method may further comprise monitoring a speed of the air mover 106. The method may further comprise comparing the monitored speed of the air mover to the target speed 108. The method may further comprise adjusting the operation of the motor based on the comparison 110.

The system and method of the present disclosure enables a suitable air circulation (e.g. suitable for the respective operating mode, such as for pull-down/pull-up or steady-state temperature control) within each zone of the interior space to be regulated using air mover speeds which are both variable and controlled based on calculations and/or determinations relating to suitable flow rates (e.g. volumetric flow rates) for the given zones. This may permit system assurance and control over power consumption of the refrigeration system (in particular, power control relating to the air movers) and distribution of heat transfer and power resources between multiple zones. In contrast, it may be appreciated that a closed-loop system (e.g. feedback loop) which controls an air mover to operate at a continuous speed, or solely based on a temperature within the respective zone is not capable of balancing heat transfer and power consumption resources between respective zones. When an air mover is controlled so that the speed is based on an offset from a temperature set point, for example, this may lead to an excessively or unnecessarily high power demand in a pull-down or pull-up operation as demanded by the closed-loop/feedback control system, whereas a refrigeration system according to the current disclosure may provide an amount of air circulation which is known to be suitable for maintaining a desired rate of heat transfer and mitigating hotspots, given the properties of the interior space (e.g. relating to how many zones are active, and/or the dimensions of the respective zones), in particular by more directly specifying suitable air mover speeds (or corresponding control of the respective motors). Further, by controlling the air mover speeds in accordance with the present disclosure, the air circulation and heat transfer in the respective zones may be controlled based on predetermined calculations and relationships that have been determined to provide suitable circulation and heat transfer effects in the zone, and/or suitable heat transfer at the heat exchanger to provide a good heat exchange refrigeration capacity and/or efficiency. The invention therefore provides for such performance parameters to be controlled independently or with less reliance on other variable controls, such as temperature set-point monitoring.

The system also improves ease of use for a user, as the user is not required to know a suitable fan speed setting for each particular operating condition or zone configuration; instead, the user may only provide input relating to the operating configuration and the arrangement of zones within a transport refrigeration unit. Nevertheless, implementations of the invention as disclosed herein may provide functionality for a user or operator to select a particular zone flow parameter within a range of selectable (e.g. permitted) zone flow parameters that the controller determines, for example using a user input as described elsewhere herein. It may be that, within a range of selectable zone flow parameters (e.g. a range of flow rates), there is a trade off between performance, for example between zone flow temperature uniformity and/or heat exchange performance and circulation speed. A user may have a preference for this trade-off (for example to keep flow rates and related fan speeds low when transporting delicate flowers), and so the invention provides for the user to select values within a range of acceptable performance.

The invention claimed is:

1. A transport refrigeration system for a refrigerated transport unit having an interior space comprising two or more zones, the system comprising:
a refrigeration circuit configured for temperature control of the two or more zones;
a controller; and
wherein for each of the two or more zones:
the refrigeration circuit comprises a respective evaporator and a variable speed air mover driven by a motor, the air mover being configured to circulate a flow of return air from a respective zone past the evaporator; and
the controller is configured to:
determine a target flow rate for the return air in the respective zone;
operate the motor to maintain the target flow rate of return air in the respective zone;
wherein the target flow rate is variable, and wherein the controller is configured to determine the target flow rate based on one or more variable parameters monitored or determined by the controller;
wherein the one or more parameters include: (i) an operating status of the respective zone; and (ii) one or more parameters relating to the operating status of remaining zones of the interior space.

2. The transport refrigeration system of claim 1, wherein the one or more parameters include a dimension of the respective zone.

3. The transport refrigeration system according to claim 1, wherein the controller is configured to vary the target flow rate based on the one or more parameters independently of temperature set-point monitoring.

4. The transport refrigeration system according to claim 1, wherein the target flow rate is a target volumetric flow rate.

5. The transport refrigeration system according to claim 4, wherein the controller is configured to, for each of the two or more zones:
determine a target speed for the respective air mover based on the target volumetric flow rate, and operate the motor based on the target speed to maintain the target volumetric flow rate of return air in the respective zone.

6. The transport refrigeration system according to claim 1, wherein the controller is configured to determine the target flow rate for each zone by reference to a database of predetermined zone flow parameters correlated to one or more of:
(i) an operating status of the respective zone;
(ii) one or more parameters relating to the operating status of any remaining zones of the interior space; and
(iii) a number of zones associated with the interior space.

7. The transport refrigeration system according to claim 6, wherein the one or more parameters relating to the operating status of the remaining zones of the interior space comprises a utilization parameter which relates to the number of zones of the interior space which are subject to temperature control.

8. The transport refrigeration system according to claim 6, further comprising an input device configured to receive user input to set the zone flow parameters for each zone.

9. The transport refrigeration system according to claim 1, wherein, for each of the two or more zones, the controller is configured to determine the target flow rate based on a target air exchange rate for the zone.

10. The transport refrigeration system according to claim 9, wherein the controller is configured to determine a volume of each zone, and to determine the target flow rate for the respective zone based on the volume and the target air exchange rate for the zone, wherein the target flow rate is a target volumetric flow rate.

11. The transport refrigeration system according to claim 10, comprising, for at least one zone of the two or more zones:
a distance sensor configured to estimate one or more dimensions of the zone,
wherein the controller is configured to:
estimate the volume of the zone based on the one or dimensions; and
determine the target volumetric flow rate for the zone based on the estimated volume and the target air exchange rate for the zone.

12. The transport refrigeration system according to claim 1, further comprising, for each of the two or more zones, an air mover speed sensor configured to monitor a speed of the air mover, wherein the controller is configured to compare the monitored speed of the air mover to a target speed and adjust the operation of the motor based on the comparison.

13. A transport refrigeration unit comprising:
an interior space comprising two or more zones; and
a transport refrigeration system comprising:
a refrigeration circuit configured for temperature control of the two or more zones;
a controller; and
wherein for each of the two or more zones:
the refrigeration circuit comprises a respective evaporator and a variable speed air mover driven by a motor, the air mover being configured to circulate a flow of return air from the respective zone past the evaporator; and
the controller is configured to:
determine a target flow rate for the return air in the respective zone;
operate the motor to maintain the target flow rate of return air in the respective zone;
wherein the target flow rate is variable, and wherein the controller is configured to determine the target flow rate based on one or more variable parameters monitored or determined by the controller;
wherein the one or more parameters include (i) an operating status of the respective zone; and (ii) one or more parameters relating to the operating status of the remaining zones of the interior space.

14. The transport refrigeration unit according to claim 13, wherein the transport refrigeration system includes for at least one zone of the two or more zones:
a distance sensor configured to estimate one or more dimensions of the zone,
wherein the controller is configured to:
estimate the volume of the zone based on the one or dimensions; and
determine the target volumetric flow rate for the zone based on the estimated volume and the target air exchange rate for the zone, and
wherein the transport refrigeration unit has one or more moveable partitions such that the at least one zone associated with the distance sensor has a variable volume, and wherein the distance sensor is configured to monitor one or more dimensions that vary responsive to movement of a respective partition.

15. A method of controlling airflow in a refrigerated transport unit having an interior space comprising two or more zones, the method comprising, for each zone, a controller:
determining a target flow rate for a flow of return air from the respective zone past an evaporator associated with the zone;
operating a motor based on the target flow rate to drive a variable speed air mover to provide airflow through the zone;
wherein the target flow rate is variable, and wherein the controller determines the target flow rate based on one or more variable parameters monitored or determined by the controller;
wherein the interior space includes multiple zones, and the one or more parameters include (i) an operating status of the respective zone; and (ii) one or more parameters relating to the operating status of the remaining zones of the interior space.

16. The method of claim 15, wherein the one or more parameters include a dimension of the respective zone.

17. The method of claim 15, wherein the controller varies the target flow rate based on the one or more parameters independently of temperature set-point monitoring.

18. The method according to claim 15, wherein the controller determines the target flow rate for each zone by reference to a database of predetermined zone flow parameters, wherein the method comprises:
setting or updating one or more zone flow parameters in the database.

19. The method according to claim 18, wherein the setting or updating is performed via a user interface of the transport refrigeration system, or by a remote communications link.

* * * * *